Figure 2:
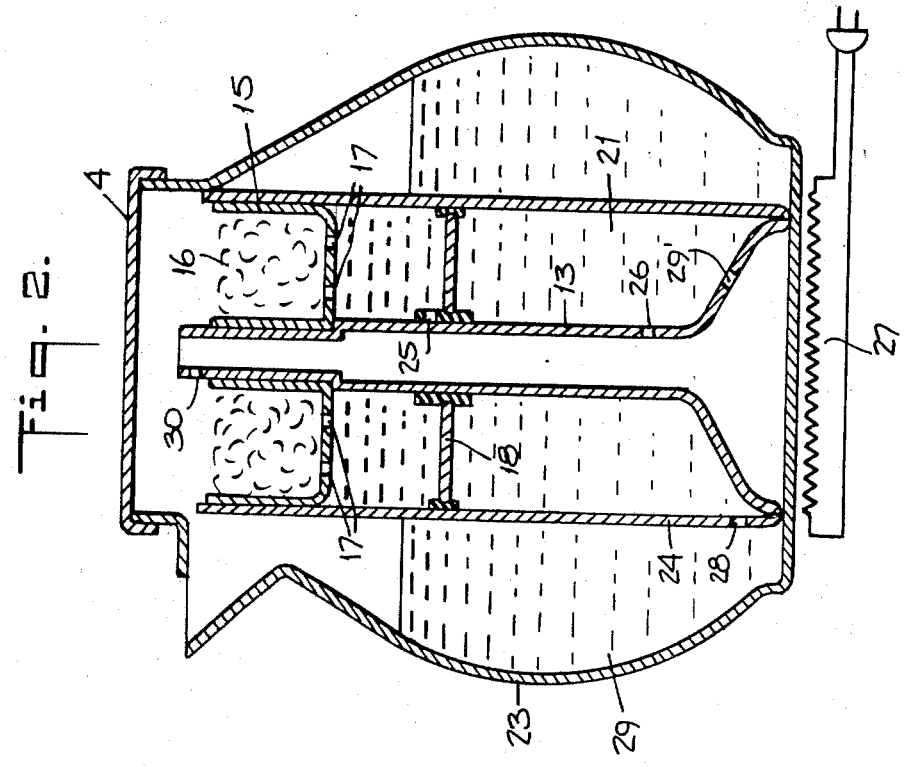

United States Patent

[11] 3,527,153

| [72] | Inventor | Carl Orlando<br>47 Willow Road, New Shrewsbury, New Jersey 07724 |
|---|---|---|
| [21] | Appl. No. | 755,593 |
| [22] | Filed | Aug. 27, 1968 |
| [45] | Patented | Sept. 8, 1970 |

[54] COFFEE MAKER
7 Claims, 2 Drawing Figs.

| [52] | U.S. Cl. | 99/315 |
|---|---|---|
| [51] | Int. Cl. | A47j 31/10 |
| [50] | Field of Search | 99/313, 314, 315-320, 307, 304, 306 |

[56] References Cited
UNITED STATES PATENTS

| 1,136,776 | 4/1915 | Collins | 99/314 |
|---|---|---|---|
| 3,380,374 | 4/1968 | Lowerre | 99/314X |

FOREIGN PATENTS

| 260,028 | 11/1912 | Germany | 99/313 |
|---|---|---|---|

Primary Examiner—Robert W. Jenkins
Attorney—Harry E. Westlake, Jr.

ABSTRACT: A device is described for use in percolator type coffee makers, comprising a more or less liquid tight movable divider which is placed under the solid coffee and on top of the water. The hot water percolating through the solid coffee drops on top of the divider which moves down as water is pumped from beneath it and hot brewed coffee collects above it. The brewed coffee is thus never recycled through the percolator and is able to retain a better taste and aroma.

Patented Sept. 8, 1970

3,527,153

INVENTOR.
CARL ORLANDO
BY
Harry E. Westlake, Jr.
ATTORNEY

COFFEE MAKER

This invention relates to a new device for use in coffee makers. More specifically, it relates to an improvement in coffee makers wherein hot water is heated in a lower container and transferred to an upper container holding solid coffee, through which the water percolates to extract the flavor, the improvement of this invention comprising a movable separator in the lower container positioned so that the hot water is removed from below the separator and the coffee extract after percolation is collected above the said separator, the separator having its contacts within said lower container sealed to liquid passage. In a broader sense, this invention relates to an apparatus for liquid extraction of solids which operates in a limited volume.

In the past, the brewing of coffee has progressed from merely boiling a suspension of coffee beans in water to more sophisticated apparatus using ground beans through which solid hot water is allowed to percolate. These devices include those usually described as drip coffee makers, vacuum coffee makers and percolators. Of these types, the percolator has always had the most appeal, because of its simplicity of operation, compactness, adaptability to automatic operation and lack of need of operator attention during brewing.

Despite the fact that the percolator type is the most attractive from many standpoints, it is, in practice, the least effective method to extract the usable flavor and aroma from coffee beans. This is due to the recirculation of the brewing coffee by the heat pump, for once the percolating hot water finds its way back into the liquid reservoir, the pump is circulating coffee not plain water. The continuous boiling of brewing coffee, required by this type of apparatus, has a deleterious effect on the volatile materials which comprise the flavor and aroma of the brew, both by volatilization and decomposition.

While the drip and vacuum types of coffee maker avoid reboiling brewed coffee, they require separate containers for the hot water and the coffee and, in addition, do not provide for extraction from the ground coffee at the optimum temperature, since only at the initial contact is the water at the optimum temperature.

I have found that, by a single device, all the advantages of both types of coffee makers can be combined. I have found that the insertion of a movable separator into the water chamber or lower compartment of a percolator coffee maker, with the separator fitted with means for sealing all contacts with surfaces in such chamber and with the heat pump below the separator and the delivery of extracted coffee above the separator, provides a percolator coffee maker which gives a better brew than any of the drip or vacuum types.

It is an advantage of my invention that it is usable in any standard commercially available percolator type of coffee maker, provided the separator is constructed to fit the peculiar dimensions of the individual device.

It is a further advantage of my invention that the aroma and flavor is extracted constantly at the optimum temperature.

It is also an advantage of the invention that there is no need for the apparatus to have two chambers, each capable of holding the full liquid contents, since the decrease in volume of hot water as yet unused is compensated by the increase in volume of extracted coffee above the separator, the latter sinking slowly as the water below is pumped out and the brewed coffee above is collected.

It is a still further advantage of my invention that the advantages of automatic control which makes a percolator type so attractive are combined with avoidance of the constant reboiling which causes decomposition and/or volatilization of the aroma and flavor in the ordinary percolator.

It is also an advantage of this invention that it is applicable in a manner broader than the above preferred embodiment to use as a very efficient and compact extraction apparatus for liquid extraction of solids, generally.

Figure 1:
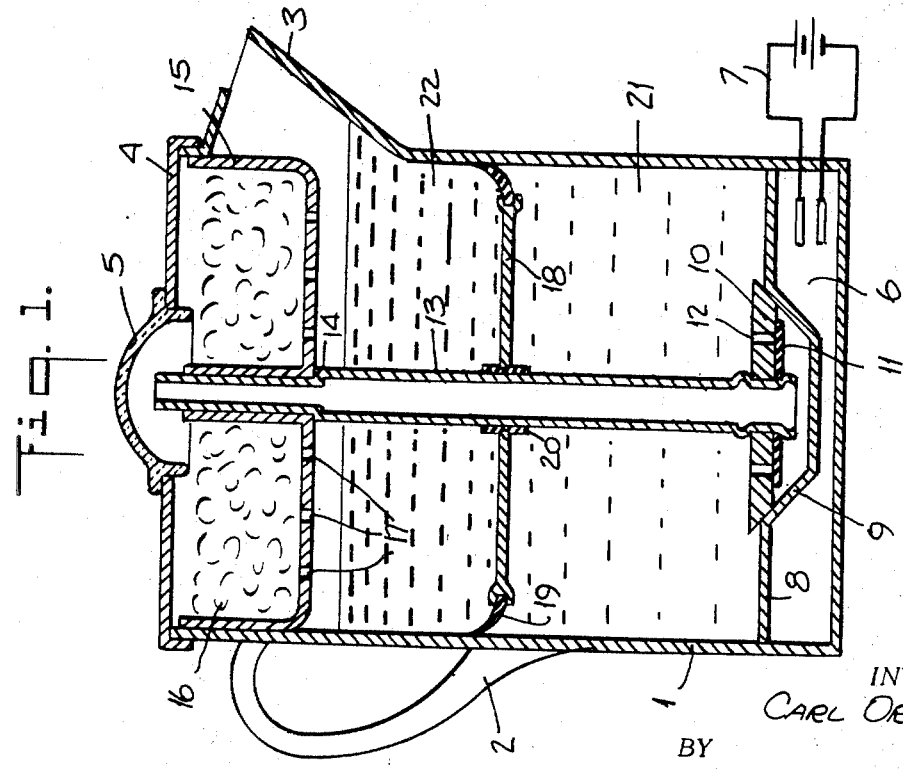

All these and other advantages can be seen by study of the drawings which illustrate by invention, in which:

FIG. 1 is a vertical cross sectional view through the center axis of a coffee maker operating on the principles of this invention; and FIG. 2 is a vertical cross sectional view through the vertical axis, of a different shaped coffee maker showing some of the other possible variations which can be incorporated in this invention.

In FIG. 1, a coffee pot 1, having handle 2 and pouring spout 3 is capped with a lid 4. The lid is shown, as is true of many percolator coffee makers, with dome 5 made of glass or other heat resistant transparent material. At the base of the pot is a heater 6 (not here shown in detail since it can be any desired standard heating element) powered by an electrical source 7. The heater element is separated from the contents of the pot by a divider 8 having a well 9 in the center. The heater 6 is usually concentrated near the well 9, although elements may be distributed all over the base. Divider 8 may be manufactured of a good heat conducting material to produce a heat sink for selectively distributing throughout divider 8 the heat produced by heater 6. Fitting into the well 9 is a conventional design percolator pump 10 having valve 11 and port 12. Fitted into the pump 10, and extending from below it in well 9 to near the top of the coffee pot 1 is tube 13 on which an indent 14 supports a basket 15 in which solid coffee 16 is placed. The basket 15 is fitted with drainage holes 17 through which any liquid percolating through the coffee 16 can drain. Between the basket 15 and the divider 8 is placed a movable separator 18 which is sealed at the walls of the pot 1 by flexible seal 19 and around the tube 13 by a seal 20.

In the operation of this coffee maker, water 21 is placed in pot 1 above the divider 8. The separator 18 is then inserted on top of the water 21 around the tube 13. The basket 15 is then inserted on tube 13 so as to rest on indent 14 and coffee 16 is charged therein. Heater 6 is operated and, as the water 21 gets hot, the percolator pump 10 operates to deliver boiling water to the top of tube 13, where it splashes against dome 5 and is distributed on top of coffee 16. It percolates through coffee 16 extracting aroma and flavor and runs out through holes 17 into the chamber 22 above separator 18. As water is removed from below the separator 18 the latter sinks by action of the pressure difference making room for the collection in chamber 22 of the brewed coffee. When all the water 21 has been pumped out of the area below separator 18, the heater 6 can be automatically turned off by any of the known standard devices for such operation such as a thermostat (not shown). The brewed coffee in upper chamber 22 can then be poured out spout 3.

Any of the variables known in standard percolator coffee makers can be used in connection with this device. The maker 1 need not have the cyclindrical shape here depicted. It can have any shape practical for contact of the separator 18 and its sealer 19 with the walls. The tube 13 need not be centered, so long as liquid passage is properly sealed by seal 20. The pot may be made of any suitable material. The separator 18 may be made of any desirable material, although use of a heat conducting material such a aluminum is advantageous to keeping the collected coffee in chamber 22 hot. Alternatively, however, chamber 22 could be separately impervious to the action of hot water and coffee. Seal 19 must be shaped and dimensioned so as to meet the walls of pot 1 in all positions. Variations in diameter of pot 1, for aesthetic reasons, if not too drastic, can be readily accommodated. If too drastic an inner wall of cyclindrical shape can be used as shown in FIG. 2.

The heater 6 can be any standard device operated by any known power source. It need not be built into the pot 1 as here shown but can be external or separate such as a hot plate, stove or other heat source.

The separator 18 is here shown as a flat disk fitted with seals 19 and 20. It can also have any other convenient shape, so long as means for sealing its contacts with the surfaces in the chamber are provided. It even could be a movable basket floating on water 21 and collecting the extracted coffee as it comes through holes 17, depending on its own shape to hold the coffee, rather than any seals along its contacts with surfaces of the pot. For compactness, the size of such basket can be such that, at the start, it encircles coffee container 15 and drops down as brewed coffee is accumulated.

In FIG. 2, the shell 23 of the coffee maker is no longer cylindrical but has a variable diameter. This vase-like shell not only makes for a more aesthetic appearance but allows for a greater volume of coffee to be made. Set inside shell 23 is a cylindrical enclosure 24 inside which basket 15 is mounted around tube 13. The separator 18 has, in its seal around tube 13, an orifice 25. Tube 13 has in its base a matching orifice 26. The internal heater 6 of FIG. 1 is replaced with an external heater 27. Enclosure 24 is pierced with one or more passages 28, affording liquid passage from the outer compartment 29 to the lower compartment 21. One or more passages 29, pierce the tube 13 permitting heater 27 to boil water from compartment 21 and pump it out tube 13 into the coffee container 15. Brewed coffee collects in the upper chamber 22 and separator 18 sinks slowly. Water feeds from outer compartment 29 through passages 28 into lower compartment 21. The solid coffee 16 in basket 15 absorbs a certain amount of water which will never seep through passages 17. This hold up thus is allowed for by the excess water from outer compartment 29.

Another variation shown in FIG. 2 is alarm opening 30 at the top of tube 13. When separator 18 sinks to the point where orifice 25 matches orifice 26, passage of brewed coffee in upper chamber 22 passes into the space at the bottom of the tube 13. A controlled amount of coffee, controlled by the size of the orifices, passes into the space at the bottom of the tube 13. When this occurs, the amount of water available to be pumped out through tube 13 had decreased to a point where no further pumping action is seen. The brew leaking through orifices 25 and 26 is boiled and the steam thus produced exhausts through alarm opening 30 and signals the end of the brewing process.

Any or all of the variations shown in FIG. 2 can be used in the principal device of FIG. 1. Other variations include making the delivery tube 13 an external tube, leading outside the pot to the top of basket 15. Also, especially in larger versions, a drain valve can be tapped into the maker above the final position of separator 18 to permit drawing brewed coffee without need to pour through a spout. Another variation is to insert a mechanical pump in place of the heat pump 6 or the external heater 27. The latter then can serve only to heat and the pumping action can be left to the mechanical pump.

Separator 18 can be in the form of a floating container which slowly sinks. The seals 19 and 20, in such a case are omitted and by using a close fit of the floating container, a limited leakage from the brew container 22 into the water container 21 is tolerable if not too extensive. This variation is usable even with separator 18 as a flat disk with a reasonably close fit to the walls of the container. Thus, in its broadest sense, separator 18 need only be provided with a means for relatively restricted or limited passage of liquid from one side to the other.

While this invention is discussed in terms of brewing of coffee, it is obvious that its physical embodiment is also usable to brew tea or any other similar potable solution involving aqueous extraction of a solid.

Variations and equivalents will be obvious to those skilled in the art. Thus, the above embodiments are shown for illustration of the principle of my invention.

I claim:
1. In a device for extracting a potable solution from a solid, such as brewing coffee or tea, which comprises in combination:
   a. a container for hot water;
   b. means for heating said container for hot water;
   c. a container for solid to be extracted;
   d. means for transferring said hot water to said container for solid to be extracted;
   e. means for passage of extract from said container for solid back to said container for hot water; and
   f. means for delivery of said extract to container outside said device sealed means being sealed from said container for hot water, the improvement which comprises in combination:
   i. a movable separator positioned in said container for hot water such that;
   ii. said above means (d) for transferring hot water leads from one side of said separator;
   iii. said above means (e) for passage of extract back to said container for hot water leads to the opposite side of said separator to that from which said means (d) leads;
   iv. said separator having means for severely restricted liquid passage from one side of said separator to the other at the points of proximity to inner surfaces of said container for hot water; and
   v. said means for delivery to outside containers being sealed by external means or by terminating on the opposite side of said separator from said container for hot water.

2. The apparatus of claim 1 in which the means for severely limited liquid passage are means for sealing or restricting against such passage.

3. The apparatus of claim 2 in which the said means for heating hot water is built into the device.

4. The apparatus of claim 3 in which said means for transferring hot water to said container for solid is a heat pump.

5. The apparatus of claim 1 in which said device has an outer shell of variable diameter and an inner cylindrical shell in which said separator is fitted.

6. The apparatus of claim 1 in which the means for heating is external.

7. The apparatus of claim 1 in which the separator is a movable basket into which said means for passage (e) leads.